US006619138B2

(12) United States Patent
Kettle, Jr. et al.

(10) Patent No.: US 6,619,138 B2
(45) Date of Patent: *Sep. 16, 2003

(54) APPARATUS FOR DYNAMICALLY ADJUSTING SIZE OF AN ORIFICE TO INCREASE ACCURACY IN MEASURING THE RATE OF AIR FLOW

(75) Inventors: Paul J. Kettle, Jr., Ijamsville, MD (US); Richard S. Klemanski, Walkersville, MD (US)

(73) Assignee: Westinghouse Air Brake Technologies Corporation, Wilmerding, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,900

(22) Filed: Jul. 7, 1999

(65) Prior Publication Data

US 2003/0066360 A1 Apr. 10, 2003

(51) Int. Cl.[7] ................................................ G01F 1/37
(52) U.S. Cl. ................................. 73/861.52; 73/861.53
(58) Field of Search .................... 73/861.52, 118.2, 73/861.61, 861.02, 40.5 A, 46, 861.53, 861.58, 118.1, 861.75; 137/8

(56) References Cited

U.S. PATENT DOCUMENTS

| 1,205,787 A | * | 11/1916 | Rosencrants | ............. | 73/861.53 |
| 3,748,855 A | * | 7/1973 | Day | ............................. | 60/290 |
| 3,889,535 A | * | 6/1975 | Bull et al. | ............... | 73/861.54 |
| 4,372,169 A | * | 2/1983 | Hughes | .................... | 73/861.22 |
| 5,131,612 A | * | 7/1992 | Skantar | ....................... | 246/107 |
| 5,135,823 A | * | 8/1992 | Eales | .............................. | 215/6 |
| 5,808,188 A | * | 9/1998 | Chriswell et al. | ........... | 73/118.2 |
| 5,898,108 A | * | 4/1999 | Mieczkowski et al. | .... | 73/118.1 |
| 6,029,527 A | * | 2/2000 | Seitz et al. | ............... | 73/861.52 |

* cited by examiner

Primary Examiner—Harshad Patel
(74) Attorney, Agent, or Firm—James Ray & Associates (57) ABSTRACT

A flow adapter for measuring the rate at which air flows into the brake pipe. The adapter includes a housing, a flow valve and a transducer. The primary passage of the housing contains a primary orifice and a secondary passage contains a secondary orifice. The flow valve is disposed within a supplemental passage. When the rate of air flowing from the input passage into the input chamber is less than or equal to a predetermined amount, the flow valve closes the supplemental passage. When the flow rate into the input chamber is greater than the predetermined amount, the flow valve opens the passage to an extent determined by the magnitude of the flow rate. This allows air to flow through the supplemental passage, in addition to that flowing through the primary passage. The transducer generates a signal proportional to the difference in pressure between input and output chambers.

16 Claims, 2 Drawing Sheets

APPARATUS FOR DYNAMICALLY ADJUSTING SIZE OF AN ORIFICE TO INCREASE ACCURACY IN MEASURING THE RATE OF AIR FLOW

FIELD OF THE INVENTION

The invention generally relates to flow adapter mechanisms of the type used to measure the rate at which air flows into the brake pipe of a locomotive. More particularly, the invention pertains to a dynamic flow adapter that is capable of dynamically varying the flow of air through the adapter according to the magnitude of the flow rate it is used to measure. Still more particularly, the dynamic flow adapter (i) employs for low to medium flow rates a primary orifice in a primary passage through which air flows to provide highly accurate measurements of flow rate and (ii) also opens for higher flow rates, to the extent determined by the magnitude of the flow rate, a dynamic flow valve disposed in a supplemental passage so as to assure that a sufficient quantity of air can be provided to the brake equipment of the train when the brake pipe must be quickly charged.

BACKGROUND OF THE INVENTION

The following background information is provided to assist the reader to understand the environment in which the invention will typically be used. The terms used herein are not intended to be limited to any particular narrow interpretation unless specifically stated otherwise in this document.

A freight train typically includes a plurality of locomotives, a plurality of railcars and a pneumatic trainline known as the brake pipe. A conventional freight train has its locomotives connected in series to form what is referred to as a locomotive consist. Alternatively, another type of freight train has its locomotives strategically positioned throughout the train so as to distribute more evenly the propulsive and braking power along its length. A train with its locomotives distributed in this way is said to operate in a mode of operation referred to as either distributed power operation or multiple unit service. The locomotives of a multiple unit freight train are equipped, collectively, with special equipment known as a Remote Multiple Unit (RMU) control system. Before discussing the specific aspects of conventional and multiple unit freight trains to which the invention relates, more elementary aspects of train operation are introduced to aid the reader in understanding the preferred use(s) to which the invention will be put.

The brake pipe is the means by which service and emergency brake commands are pneumatically conveyed from the brake control system in the lead locomotive to each of the vehicles in the train. The brake pipe is essentially one long continuous tube that runs from the lead locomotive to the last railcar. The brake pipe is actually composed of a series of interconnected pipe lengths, with one pipe length secured to the underside of each vehicle. The brake pipe is formed by connecting each pipe length via a coupler to another such pipe length on an adjacent vehicle.

It is to the brake pipe that the pneumatic brake equipment on each railcar interconnects via a branch pipe. The pneumatic brake equipment typically includes an auxiliary reservoir, an emergency reservoir, one or more brake cylinders and at least one brake control valve such as an ADB, ABDX or ABDW type valve made by the Westinghouse Air Brake Company (WABCO). Under conditions known in the brake control art, each brake control valve charges its two reservoirs with the pressurized air it receives from the brake pipe. It is the pressure level within the brake pipe that determines whether a brake control valve will indeed charge its reservoirs or deliver pressurized air previously stored in one or both of its reservoirs to the brake cylinders. When so pressurized, each brake cylinder converts the pressurized air its receives from its brake control valve to mechanical force. From the brake cylinders this force is transmitted by mechanical linkage to the brake shoes. The magnitude of the force applied to the wheels and/or disc brakes of the railcar is directly proportional to the pressure built up in the brake cylinders. Forced against the wheels and/or disc brakes, the brake shoes are used to slow and/or stop the rotation of the wheels. It is thus the pressure level in the brake pipe that determines whether and to what extent the railcar brakes will be applied.

In addition to the brake pipe, a locomotive has its own pneumatic trainlines including a main reservoir equalizing (MRE) pipe, an independent application and release (IAR) pipe, and an actuating pipe. Within a locomotive consist, the MRE, actuating and IAR pipes of each locomotive connect to the MRE, actuating and IAR pipes of the adjacent locomotives. The MRE pipe is used to equalize the pressure between the main reservoirs of each locomotive in the consist. Air stored in the main reservoir of a locomotive is used to charge the brake pipe to a normal operating pressure of approximately 90 psi when the brakes are released. It is the pressure within the IAR pipe that controls the delivery of pressurized air to, and thus the operation of, the brakes of the locomotive(s) in the freight train.

A locomotive has a brake control system such as any one of the various EPIC® Brake Equipment Systems produced by WABCO. An EPIC® brake control system generally includes a cab station unit, a keyboard, a display, a locomotive interface unit (LIU), a brake control computer and a pneumatic operating unit. The cab station unit generates various signals including those representing the positions of the automatic and independent brake handles, and through its cab control computer conveys commands corresponding thereto to the brake control computer. By moving the independent brake handle, the train engineer can order the brakes to be applied and released only on the locomotive(s). By moving the automatic brake handle, the train engineer can order the brakes to be applied and released not only on the locomotive(s) but also on all railcars in the train. The level to which the brake pipe pressure is reduced or increased, and thus the amount of braking power exerted by the brakes, corresponds to the position of the automatic brake handle.

The keyboard also permits access to the brake equipment, allowing, for example, the train engineer to select whether the locomotive will be set in the LEAD CUT-IN, LEAD CUT-OUT or TRAIL mode of operation. By viewing the display, the train engineer can monitor the operation of the brake equipment. The LIU connects power and certain electrical trainlines to the brake equipment and provides various known input and control signals to the brake control computer. Operating according to its programming code and the inputs it receives, the brake control computer governs the overall operation of the brakes. According to commands received from the brake control computer, it is the pneumatic operating unit that controls the pressures in the various reservoirs and in the pneumatic trainlines so as to control the brakes.

The pneumatic operating unit features a laminate to which the brake control computer and the various pneumatically and electropneumatically operated devices mount. The laminate contains numerous ports and internal passages.

Through these ports and internal passages, the laminate interconnects these devices to each other and to branch pipes that carry air from or to the various storage tanks such as the equalizing reservoir and to the actuating pipe, the MRE pipe, the IAR pipe, the brake pipe, the brake cylinders and various other pipes on the train.

Among the various devices mounted to the laminate are an independent application and release (IAR) control portion, a brake cylinder (BC) control portion, and a brake pipe (BP) control portion. These control portions are primarily controlled by the brake control computer. The IAR control portion features pneumatic logic circuitry along with solenoid operated valves by which the pressure in both the actuating and IAR pipes can be controlled. The BC control portion also features pneumatic logic circuitry along with solenoid operated valves by which the pressure in the brake cylinders on the locomotive can be controlled. The BC control portion controls the pressure in the locomotive brake cylinders in response to the commands generated by either movement of the two brake handles or pressure changes in the brake pipe, the IAR pipe, the back-up brake or the penalty brake circuitry. Especially relevant to the invention disclosed below is the BP control portion. It uses pneumatic logic circuitry and solenoid operated valves by which the pressure in the brake pipe throughout the train can be controlled. The BP control portion also controls the emergency venting and the brake pipe cut-off functions as described in relevant detail below.

Regarding the modes in which a locomotive can be set to operate, in the LEAD CUT-IN mode the brake control computer permits use of both the automatic and independent brake handles. This gives the train engineer control over the brakes of both the railcars and locomotives in the train. In the LEAD CUT-OUT mode, the brake control computer will permit use of the independent brake handle only, except for the automatic brake handle when it is placed in the emergency position. This gives the train engineer control over the brakes of the locomotives only. In the TRAIL mode, both brake handles are disabled except for the emergency position of the automatic brake handle. In a train having multiple locomotives, all locomotives operating in the TRAIL mode are basically subservient to the lead locomotive operating in either of the LEAD modes of operation.

The operation of a BP control portion is affected by the mode in which its locomotive is operated. The BP control portion is a known device whose construction and operation is shown and explained in greater detail in Operation & Maintenance Manual Document No. 4208-32, Rev. Date August 1996, published by WABCO and incorporated herein by reference.

Figure 1:
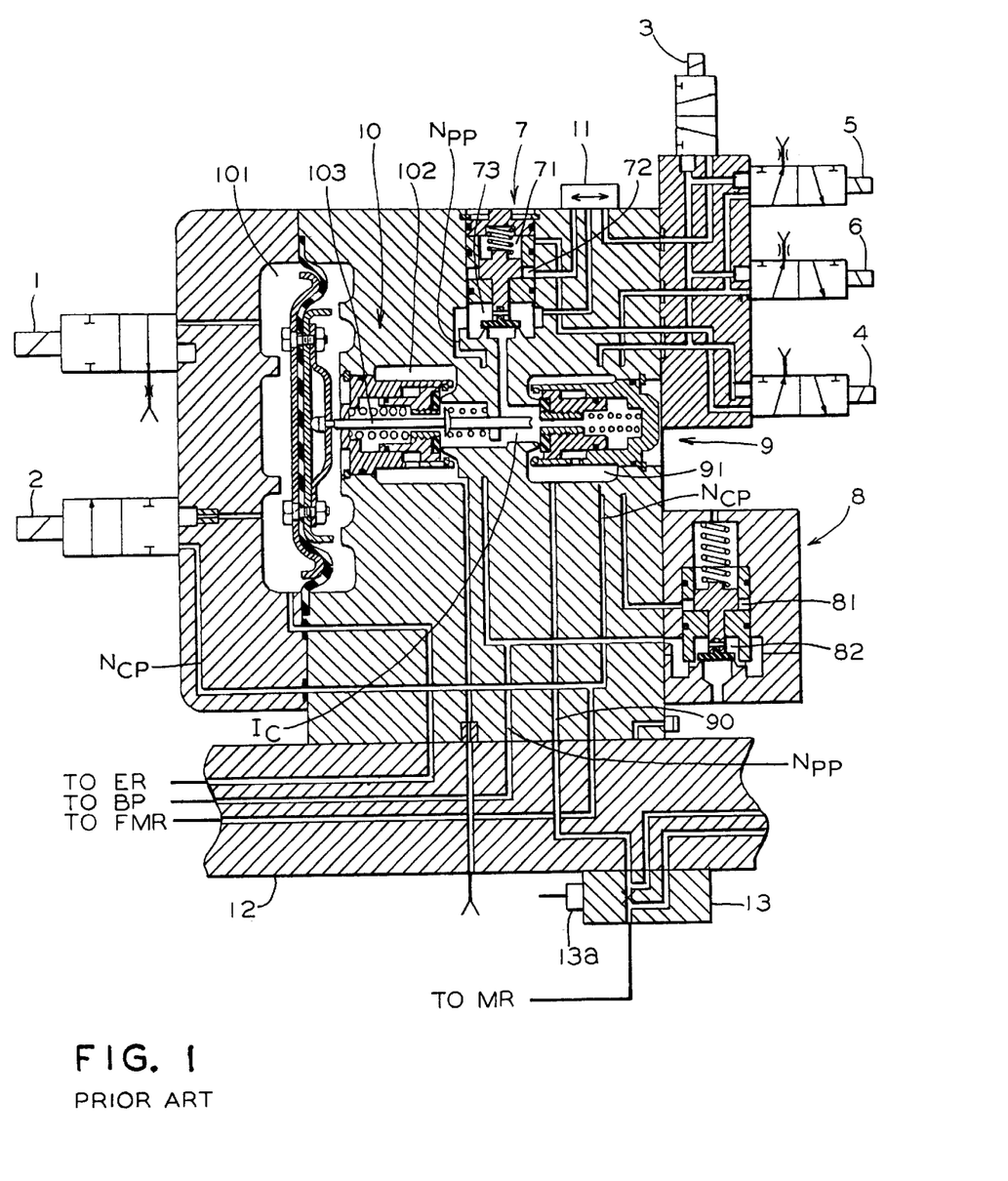
FIG. 1 is a cross-sectional view of a BP control portion and a conventional flow adapter mechanism showing the laminate of a pneumatic operating unit to which they both mount.

FIG. 1 illustrates a typical BP control portion mounted to the laminate 12. The BP control portion employs six magnet valves and four pneumatic valves. The magnet valves include application valve (AMV) 1, release valve (RMV) 2, cut-in valve (CIMV) 3, cut-out valve (COMV) 4, and first and second emergency valves (EMV1) 5 and (EMV2) 6. The pneumatic valves include a charging cut-off valve 7, an emergency vent valve 8, a supply valve 9 and an exhaust valve 10. It is through these pneumatic valves, as controlled by the magnet valves, that the locomotive supplies air to, or vents air from, the brake pipe.

The BP control portion defines several passages. Best described in terms of networks, these passages include a primary passage network $N_{pp}$ and a control passage network $N_{cp}$. The primary passage network $N_{pp}$ is essentially a web of interconnected passages that is used to interconnect the brake pipe BP to certain chambers of the pneumatic valves. Similarly, the control passage network $N_{cp}$ is used to interconnect the magnet valves to a source of control pressure such as the filtered air (FMR) supplied by the main reservoir (MR) of the locomotive. Another passage, the delivery passage 90, is interconnected to the MR (via a flow adapter mechanism 13 introduced infra). The MR, of course, serves as a source from which air can be taken to pressurize the brake pipe BP via the flow adapter mechanism and the primary passage network $N_{pp}$. Like the flow adapter mechanism 13, the BP control portion itself does not directly connect to the pneumatic pipes and reservoirs of the locomotive. Only indirectly—through the ports and passages of the laminate 12 and the various branch pipes leading thereto—does the BP control portion communicate fluidly with the pneumatic pipes and reservoirs of the locomotive.

Regarding the operation of the BP control portion when the train engineer chooses to operate the locomotive in the LEAD CUT-IN mode, the brake control computer energizes the CIMV 3 and deenergizes the COMV 4. The COMV 4 via its output port then allows closing chamber 71 of charging cut-off valve 7 to vent to atmosphere. Meanwhile, the CIMV 3 allows filtered main reservoir (FMR) air via the control passage network $N_{cp}$ to flow to the first inlet of double check valve 11. Air from the brake pipe BP is also able to flow through the primary passage network $N_{pp}$ through vent chamber 73 of charging cut-off valve 7 to the second inlet of double check valve 11. Whichever of the FMR and BP air streams exhibits the greater pressure, double check valve 11 directs the higher pressure air through its outlet to the opening chamber 72 of charging cut-off valve 7. If the pressure in either the brake pipe BP or the main reservoir (FMR) is sufficient to overcome the spring bias of charging cut-off valve 7, valve 7 assumes the cut-in in position (not shown) in which the brake pipe BP (via the primary passage network $N_{pp}$ and vent chamber 73) is in communication with intermediate chamber $I_c$ situated between the supply and exhaust valves 9 and 10.

When the automatic brake handle is moved to its release position, the brake control computer energizes both AMV 1 and RMV 2. The AMV 1 in its energized state disconnects its output port from its exhaust port thereby preventing air in the equalizing reservoir (ER) control chamber 101 from escaping to atmosphere. Meanwhile, the RMV 2 allows FMR air via the control passage network to flow into the ER control chamber 101 of exhaust valve 10. Consequently, as pressure builds in the ER control chamber 101, the pressure builds in the equalizing reservoir (ER) via the ER pipe. This pressure build up causes the exhaust valve 10 to move further to the right so as to unseat via valve stem 103 supply valve 9. Air from the MR of the locomotive is then able to flow (through the flow adapter mechanism) into delivery passage 90 through supply chamber 91 through chamber $I_c$ and into charging cut-off valve 7. Because the locomotive is operating in the LEAD CUT-IN mode, cut-off valve 7 is open so the air from the MR continues flowing through vent chamber 73 and the primary passage network $N_{pp}$ into the brake pipe BP. Pressure in the brake pipe thus rises along with the pressure in the equalizing reservoir. As detailed below, the flow adapter mechanism provides to the brake control computer an electrical signal indicative of the rate at which air is flowing into brake pipe BP. For as long as valve 7 is held in the cut-in position (i.e., locomotive operated in the LEAD CUT-IN mode) and the automatic brake handle kept in the release position, the MR will remain in communication with the brake pipe BP, endeavoring to keep the brake pipe BP fully charged even if the brake pipe BP leaks.

Responding pneumatically to this increase in brake pipe pressure, the brake control valves on each railcar then vent air from the brake cylinders to release completely the railcar brakes. Incidentally, the BC control portion releases the locomotive brakes by responding both pneumatically to the increase in brake pipe pressure and electrically (via solenoid operated valves) to the ensuing commands issued by the brake control computer.

Should the automatic brake handle then be moved into its full service position or any other position between minimum and continuous service, the brake control computer deenergizes both the AMV 1 and the RMV 2. The AMV 1 in its deenergized state connects its output port to its exhaust port thereby allowing air in the ER control chamber 101 to escape to atmosphere. Meanwhile, the RMV 2 disconnects its input port from its output port thereby preventing FMR air via the control passage network from flowing into the ER control chamber 101. Consequently, as pressure drops in the ER control chamber 101, the pressure drops in the equalizing reservoir via the ER pipe. This pressure drop causes the exhaust valve 10 to move back to the left so as to seat supply valve 9 (shown) and unseat itself (not shown). With supply valve 9 closed, this prevents air from the MR from flowing (via the flow adapter mechanism and delivery passage 90) through supply chamber 91 into chamber $I_c$ and thereby disconnects the MR from the brake pipe BP. With exhaust valve 10 open and charging cut-off valve 7 still in the cut-in position (i.e., open), air is able to flow from brake pipe BP (through primary passage network $N_{pp}$) into vent chamber 73. Air from the brake pipe BP continues flowing through intermediate chamber $I_c$ and the exhaust chamber 102 of exhaust valve 10 to atmosphere via exhaust passage 104 and exhaust port EX. Pressure in the brake pipe thus drops along with the pressure in the equalizing reservoir.

Responding pneumatically to this decrease in brake pipe pressure, the brake control valves on each railcar supply pressurized air from the appropriate reservoir(s) to the brake cylinders to apply the railcar brakes. Pressure transducers provide signals indicative of the current pressures in the equalizing reservoir and brake pipe BP to the brake control computer. Based in part on these signals, the brake control computer then commands the BC control portion to direct air (via solenoid operated valves) from the main reservoir to the locomotive brake cylinders to apply the locomotive brakes.

When the equalizing reservoir pressure has reached the level corresponding to the position of the automatic brake handle, or upon moving the handle back into the service zone from the continuous service position, for example, the brake control computer reenergizes the AMV 1. The AMV 1 thus again disconnects its output port from its exhaust port thereby preventing air in the ER control chamber 101 from escaping to atmosphere. The RMV 2, still deenergized, prevents FMR air via the control passage network $N_{cp}$ from flowing into the ER control chamber 101. Consequently, the pressure is held constant in ER control chamber 101 as well as in the equalizing reservoir via the ER pipe. Exhaust valve 10 remains open as long as the pressure of the air existing in the brake pipe BP (and primary passage network $N_{pp}$, vent chamber 73, chamber $I_c$ and exhaust chamber 102) overcomes the opposing bias of exhaust valve 10. The overall bias of the exhaust valve 10, however, is selected so that the exhaust valve 10 closes once the brake pipe pressure drops to match that in the equalizing reservoir. The BP control portion thus assumes a lap state in which the pressure within the equalizing reservoir ER and the brake pipe BP is held at the existing level.

Responding to this constant brake pipe pressure, the brake control valves on each railcar also assume a lap state in which the force with which the railcar brakes are applied is held constant. The BC control portion follows by assuming a lap state in which the pressure in the locomotive brake cylinders is also held at the then existing pressure level.

Should the automatic brake handle be moved into its emergency position, the BP control portion is controlled in essentially the same way as it is when the automatic brake handle is placed in its continuous service position. In addition, the cab control computer conveys to the brake control computer the emergency command, i.e., the signal indicating that the automatic brake handle has been placed in the emergency position. The brake control computer responds by immediately energizing the EMV1 5. The EMV1 5 in its energized state connects its input and output ports thereby allowing FMR air (via control passage network $N_{cp}$) to flow to the opening chamber 81 of emergency vent valve 8. Placing the automatic brake handle into its emergency position also closes a microswitch (not shown). When closed, the microswitch energizes the EMV2 6. The EMV2 6 in its energized state likewise connects its input and output ports thereby allowing FMR air (via control passage network $N_{cp}$) to flow to opening chamber 81. This quick pressure build up in opening chamber 81 causes the emergency vent valve 8 to open and thereby vent the brake pipe BP (via primary passage network $N_{pp}$) to atmosphere at an emergency rate.

Responding pneumatically to the precipitous drop in brake pipe pressure, the brake control valves on each railcar quickly supply pressurized air to the brake cylinders thereby applying the railcar brakes. The BC control portion responds as well by directing air from the main reservoir to the locomotive brake cylinders thereby quickly applying the locomotive brakes.

Regarding the operation of the BP control valve portion when the train engineer chooses to operate the locomotive in the TRAIL mode, the brake control deenergizes the CIMV 3 and energizes the COMV 4. The CIMV 3 in its deenergized state connects its output port to its exhaust port thereby venting the first inlet of the double check valve 11 to atmosphere. The opening chamber 72 of charging cut-off valve 7 can thus only receive air from the brake pipe BP (via the second inlet of double check valve II, vent chamber 73 and primary passage network $N_{pp}$). Meanwhile, the COMV 4 connects its input and ouput ports thereby allowing FMR air via the control passage network $N_{cp}$ to flow to the closing chamber 71 of cut-off valve 7. Along with the spring bias of valve 7, the pressure exerted by FMR air stream forces charging cut-off valve 7 to close. Charging cut-off valve 7 thus assumes the cut-off position, as shown in FIG. 1, in which the brake pipe no longer communicates (via the primary passage network $N_{pp}$) with intermediate chamber $I_c$.

Operating a locomotive in the TRAIL mode prevents its BP control portion from affecting the pressure within the brake pipe as long as its automatic brake handle is kept outside the emergency position. Because the charging cut-off valve 7 is closed when the locomotive is operating in the TRAIL mode, the brake pipe BP cannot communicate with chamber $I_c$ situated between the supply and exhaust valves 9 and 10. Consequently, the brake pipe BP can neither be exhausted (as network $N_{pp}$ and chamber 73 are blocked from chamber $I_c$, chamber 102, passage 104 and port EX) nor charged (as the MR, the flow adapter mechanism, and delivery passage 90 are blocked from chamber 73 and network $N_{pp}$).

When the automatic brake handle is moved into the emergency position, the BP control portion will affect brake pipe pressure even though its charging cut-out valve 7 is in the cutout position. As described previously, moving the automatic brake handle into the emergency position causes both EMV1 5 and EMV2 6 to energize thereby allowing FMR air (via the control passage network $N_{cp}$) to flow rapidly to opening chamber 81. This quick pressure build up in opening chamber 81 causes the emergency vent valve 8 to open and thereby vent the brake pipe BP (via primary passage network $N_{pp}$) to atmosphere at an emergency rate.

Responding pneumatically to the precipitous drop in brake pipe pressure, the brake control valves on each railcar quickly supply pressurized air to the brake cylinders thereby applying the railcar brakes. The BC control portion responds as well by directing air from the main reservoir to the locomotive brake cylinders thereby quickly applying the locomotive brakes.

Flow adapter mechanisms of varying design have long been used to monitor the status of the brake pipe. In practice, a flow adapter mechanism is typically mounted to the laminate 12 and incorporated between the MR and the delivery passage 90 of the BP control portion. Generically illustrated in FIG. 1 is one such adapter mechanism 13. It is through the flow adapter mechanism 13 that air from the MR must flow to reach the BP control portion on the locomotive. Whether this air stream is actually channeled to the brake pipe BP at any given time depends, of course, on how the BP control portion is operated.

Figure 2:
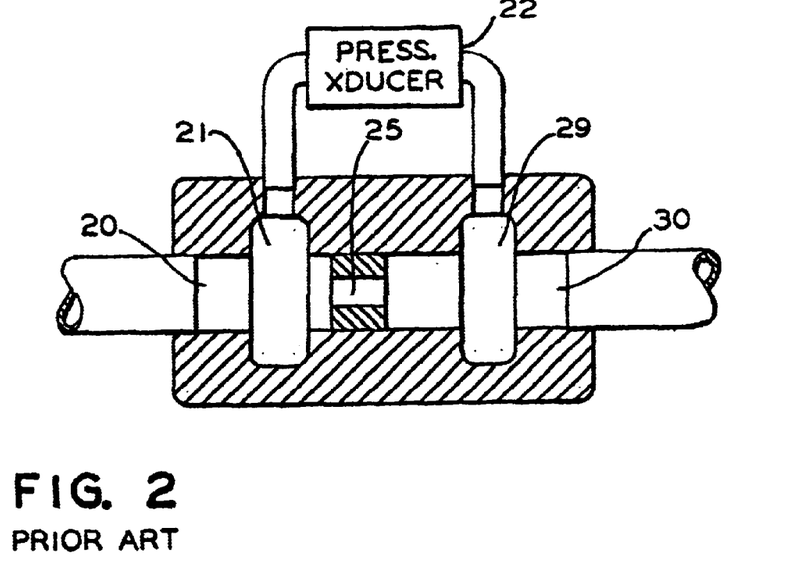
FIG. 2 is an abbreviated cross-sectional view of the conventional flow adapter mechanism shown in FIG. 1.

A simplified cross-sectional view of such a mechanism, such as the L-19-B flow adapter mechanism produced by WABCO, is shown in FIG. 2. The body of the mechanism defines an input passage 20, input chamber 21, an output chamber, and an output passage 30. Between the input and output chambers is defined an orifice 25 measuring $^{19}/_{64}$ths of an inch in diameter. The input passage 20 connects ultimately to the MR whereas the output passage 30 connects to the delivery passage 90 of the BP control portion. Tapped into chambers 21 and 29, a differential pressure transducer 22 simultaneously senses the pressure in each chamber and generates an electrical signal whose voltage, current or other electrical quality is proportional to the difference in pressure across the orifice. This analog electrical signal is provided to the brake control computer where it is converted to digital form.

By this electrical signal, the rate at which air flows through the orifice 25, and thus the rate at which the brake pipe BP is being pressurized via the BP control portion, is being conveyed to the brake control computer. The brake control computer not only acts upon the resulting digital signal, as described infra, but conveys it to the cab control computer. The cab control computer, in turn, conveys it to the display on which the train engineer can monitor the current rate, if any, at which air is flowing to the brake pipe BP of the locomotive.

It is important to keep the train engineer apprised of the current flow rate for several reasons. For example, before a freight train is ready to depart from a stop, the train engineer must be certain that the train is safe to operate. This includes making sure that the storage reservoirs on each vehicle have fully charged since the last brake application. During normal operation, as the brake pipe is being charged, the flow rate indicator on the display should show the flow rate gradually decreasing, eventually falling below a preset level. Once the flow rate drops below this preset level (e.g., 60 cubic feet per minute (CFM) for some railroad companies), the train engineer knows that the storage reservoirs now contain an amount of air adequate to make the next brake application.

If the flow rate doesn't fall below the preset level, this indicates a problem within the charging system, typically a rather substantial leak from the brake pipe. As another example, during normal operation with the brakes completely released, the flow rate indicator should indicate a relatively constant value (e.g., 59 CFM). This value indicates the rate at which air is flowing into the brake pipe to compensate for the air inevitably lost due to minor leakage. It will vary from train to train based on factors such as ambient temperature, the condition of the brake control valves on the railcars, and the extent to which the brake pipe leaks.

Yet another example involves how the train engineer can use the flow rate indicator to determine when a restriction in the brake pipe has developed. When the brakes are released after a brake application, the train engineer would normally expect to observe a relatively high flow rate initially, with the rate eventually decaying to the aforementioned constant level. Should the flow rate be abnormally low, and/or its duration unusually short, this could indicate an obstruction in the brake pipe. Apprised of an abnormal flow rate, the train engineer can take whatever appropriate action is necessary to correct the problem.

A flow rate greater than 60 CFM will typically be encountered only when the brake pipe is being initially charged or when it is being re-pressurized (to release the brakes) after a previous brake application. A flow rate greater than 100 CFM for an extended period of time will be encountered only when the brake pipe is being initially charged or when an abnormal condition has occurred somewhere in the charging system. The L-19-B flow adapter mechanism is adjustable to accommodate the flow characteristics peculiar to the piping of any particular locomotive. A lock nut and set screw 13a provide the means to calibrate the mechanism. After loosening the lock nut, the set screw may be turned to increase flow or to decrease flow. Tightening the lock nut secures the set screw in the desired position. Proper calibration of the orifice enables such a flow adapter mechanism to provide a satisfactory flow rate to the brake equipment on any given freight train.

For a train equipped with the RMU control system for distributed power operation, the lead locomotive is operated in the LEAD CUT-IN mode, with each of the remote locomotives set to operate as indicated below. As is well known in the industry, components of the RMU control system are integrated into the brake and propulsion control systems of each locomotive. Each locomotive is equipped with a transceiver, specialized coding and decoding equipment, and various componentry that interface with the on-board brake and propulsion control systems. Merely by manipulating the brake handles and/or throttle controls in the lead locomotive can the engineer control all of the locomotives in the train. Specifically, the RMU components in the lead locomotive receive the brake and/or throttle commands from the on-board brake and propulsion control systems. These commands are converted to coded radio signals and transmitted to each of the remote locomotives. In each remote locomotive, the radio signals are decoded, then conveyed to and acted upon by the on-board brake and propulsion control systems. Each remote locomotive thus carries out the same brake and/or throttle commands as does the lead locomotive. The RMU control system also allows the engineer not only to monitor how each remote locomotive responded to the brake and/or throttle commands but also to control the remote locomotives independently of the lead locomotive.

On each remote locomotive, the RMU componentry is capable of allowing the brake and propulsion control systems to operate safely should the radio link between the lead and remote locomotives fail or be otherwise interrupted. This capability is colloquially referred to as the Comm Loss/Idle Down feature. In each remote locomotive, this feature has traditionally been implemented, in part, by using the flow adapter mechanism, with the charging cut-out valve 7 commanded to the cut-in position and the automatic brake handle commanded to the release position.

Consider, for example, a situation in which the RMU control system is operating normally, with each locomotive operating at full power and maintaining the brake pipe fully pressurized as is required when the brakes are released. Should radio communications then be interrupted, each affected remote locomotive will continue to operate, according to the last commands it received, for up to a fixed period of time, usually 90 minutes maximum, from the time at which communications first failed. If the train engineer in the lead locomotive applies the brakes while the radio link is offline, the RMU componentry in each affected locomotive will operate according to the Comm Loss/Idle Down feature. Specifically, the flow adapter mechanism provides to the RMU componentry an electrical signal indicative of the current rate at which air is flowing into the brake pipe. Operating according to its programming, the RMU componentry eventually discerns that the current flow rate is significantly greater than that required to compensate for the air lost due to normal leakage. More specifically, the RMU componentry concludes that the high flow rate is characteristic of a pneumatic command to apply the brakes rather than mere leakage from the brake pipe.

Having discerned the significance of the high flow rate, the RMU componentry directs the on-board propulsion and brake control systems to operate in a safe mode. Specifically, the propulsion control system is directed to idle the engine (s) of the locomotive. Meanwhile, the brake control system is directed to switch charging cut-off valve 7 to the cut-out position, thereby preventing the BP control portion from affecting the pressure in the brake pipe. In this manner, each remote locomotive that has lost radio contact with the lead locomotive under such circumstances will be rendered incapable of affecting propulsion and braking on the freight train. Only the lead locomotive, and those remote locomotives still in radio contact therewith, will be able to affect the pressure in the brake pipe of the train. The Comm Loss/Idle Down feature thus assures that all railcars in an RMU train will be braked consistently and safely should a brake application be made while one or more of the remote locomotives are out of radio contact with the lead locomotive.

The accuracy of prior art flow adapter mechanisms used to measure flow rate is limited due to their design. As is well known in the pneumatic arts, several factors influence how accurately the flow rate can be measured. The diameter of the orifice and the pressure of the incoming air stream are but two of the factors. Generally, for a given flow rate, the measurement of flow rate becomes more accurate as one increases the difference in pressure across the orifice. This pressure differential, of course, can be increased by reducing the size of the orifice.

Reducing the size of the orifice, however, would reduce the flow rate through the flow adapter mechanism and thus extend the time it takes to pressurize the brake pipe. Unfortunately, many of the railcars on the train may be equipped with brake control valves of a type whose operation may be adversely affected by lowering the rate at which the brake pipe is pressurized.

Flow adapter mechanisms have traditionally been designed to strike a balance between (i) the need for a high flow rate so as to assure that the railcar brake control valves will work properly and (ii) the need to measure flow rate accurately on both conventional and RMU freight trains. On conventional freight trains, an accurate measurement of flow rate is important to keep the train engineer apprised of the condition of the brake pipe. It plays an even more critical role on RMU freight trains, with respect to the ability of a remote locomotive to detect, and act upon, a brake application during disruption of the radio link. In striking this balance, the railroad industry has traditionally used a $^{19}\!/_{64}$ths of an inch orifice in its flow adapter mechanisms.

Another type of flow adapter mechanism, one having a smaller sized orifice accompanied by a mechanical check valve, has also been tried. The small orifice is used during periods in which the flow rate is low. This, of course, provides a flow rate measurement of greater accuracy. During periods in which the flow is high, however, the check valve opens to increase the rate at which air flows into the brake pipe. This particular flow adapter mechanism, however, proved to have certain shortcomings. First, with the check valve open, it provided a flow rate unacceptably high for some of the brake equipment with which it was used. Second, the accuracy of the flow rate measurement decreased far too dramatically when the check valve was opened.

A flow adapter mechanism that would enable the flow rate to be measured more accurately, and yet still allow a high flow rate during charging of the brake pipe, would be welcome in the railroad industry. This is true for conventional freight trains, but especially so for RMU equipped trains. Improving the sensitivity and accuracy with which the flow rate is measured will make a remote locomotive even more reliable in its detection of, and reaction to, a brake application during loss of radio contact.

OBJECTIVES OF THE INVENTION

It is, therefore, a primary objective of the invention to provide a dynamic flow adapter that can be used to measure accurately the rate at which air flows into the brake pipe when air is flowing into it at low to medium flow rates, and yet still allow the brake pipe to be charged quickly at higher flow rates.

Another objective is to provide a dynamic flow adapter that can be used to provide a more accurate measurement of flow rate with which to keep the train engineer in the locomotive better apprised of the condition of the brake pipe.

Yet another objective is to provide a dynamic flow adapter that will enable a remote locomotive in an RMU freight train, while monitoring the flow of air into the brake pipe, to distinguish more easily between the rate at which air normally flows into the brake pipe to compensate for minor leakage and the rate characteristic of a pneumatic command to apply the brakes.

Still another objective is to provide a dynamic flow adapter that will enable a remote locomotive in an RMU freight train to detect more readily, and act upon, a brake application during disruption of its radio link with the lead locomotive.

A further objective of the invention is to provide a dynamic flow adapter that more finely balances (i) the need for a high flow rate so as to assure that the railcar brake control valves will work properly with (ii) the need to measure flow rate accurately on both conventional and RMU freight trains.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

In a presently preferred embodiment, the invention provides a dynamic flow adapter for use in measuring the rate at which air flows into the brake pipe of a locomotive. The dynamic flow adapter includes a housing, a dynamic flow valve and a differential pressure transducer. The housing defines an input passage, an input chamber, a primary passage, a supplemental passage, an output chamber, a secondary passage and an output passage. The primary passage contains a primary orifice having a first diameter. The secondary passage contains a secondary orifice having a second diameter. The input passage directly communicates with the input chamber, and the input and output chambers communicate through the primary orifice in the primary passage. The output chamber communicates with the output passage through the secondary orifice in the secondary passage. The supplemental passage is in parallel with the primary passage and when opened allows further communication between the input and output chambers. The dynamic flow valve is disposed within the supplemental passage. When the rate at which the air is flowing from the input passage into the input chamber is less than or equal to a predetermined threshold amount, the dynamic flow valve closes the supplemental passage. When the rate at which the air is flowing into the input chamber is greater than the predetermined threshold amount, the dynamic flow valve opens the supplemental passage to an extent determined, up to a fully open position, by the magnitude of the flow rate. This allows air to flow through the supplemental passage, in addition that flowing through the primary passage. The differential pressure transducer generates an electrical signal proportional to the difference in pressure between input and output chambers.

DETAILED DESCRIPTION OF THE INVENTION

Before describing the invention in detail, the reader is advised, for the sake of clarity and understanding, that identical components having identical functions have been marked where possible with the same reference numerals in each of the Figures provided in this document.

Figure 3:
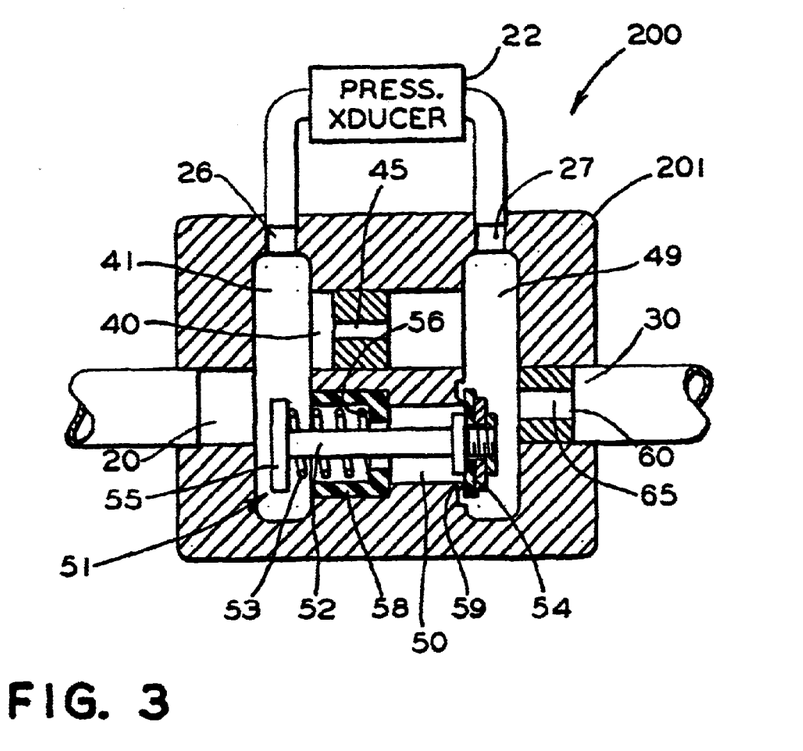
FIG. 3 is a cross-sectional view of a dynamic flow adapter according to the invention.

FIG. 3 illustrates the essential details of the invention, namely, a dynamic flow adapter, generally designated 200. The dynamic flow adapter 200 includes a differential pressure transducer 22, a dynamic flow valve 51 and a housing 201. The housing 201 defines an input passage 20, input chamber 41, an output chamber 49, and an output passage 30. Between the input and output chambers 41 and 49 is defined a primary passage 40 and a supplemental passage 50. Supplemental passage 50 is preferably positioned parallel to and below primary passage 40. Within primary passage 40 is defined a primary orifice 45. Between the output chamber 49 and the output passage 30 is defined a secondary passage 60 within which is contained a secondary orifice 65.

The input passage 20 communicates directly with input chamber 41, and input chamber 41 communicates with output chamber 49 through the primary orifice 45 in primary passage 40. The output chamber 49 communicates with output passage 30 through the secondary orifice 65 in secondary passage 60. Fitted within supplemental passage 50 is the dynamic flow valve 51. When dynamic flow valve 51 is open, supplemental passage 50 also allows communication between the input and output chambers 41 and 49.

The dynamic flow adapter 200 will preferably be incorporated into the brake control system of the locomotive in the same manner as the prior art flow adapter mechanism 13 shown in FIG. 1. Specifically, the dynamic flow adapter 200 may have its input passage 20 connected to the MR of the locomotive. More particularly, the input passage 20 will preferably connect to the MR through the main reservoir of the locomotive, and the output passage 30 will preferably connect to the delivery passage 90 of the BP control portion. Installed in this manner, the dynamic flow adapter 200 can be used to measure the rate at which air flows from the MR to the brake pipe BP of the locomotive. Whether any air is actually channeled to the brake pipe BP at any given time depends, of course, on how the BP control portion is operated by the brake control system and/or the RMU control system as noted earlier in the background section.

Referring now to the structure of dynamic flow valve 51, this flow valve features a valve stem 52, a spring 53 and a valve head 54. As viewed from the perspective of FIG. 3, the valve stem 52 takes the form of a shaft, with a contact plate 55 attached to its left end and valve head 54 attached to its right end. The contact plate 55 has a front surface and a rear surface. Any air flowing from the MR through input passage 20 into input chamber 41 will impact the front surface of contact plate 55. The rear surface of contact plate 55 serves as a first spring seat for spring 53. Formed annularly within the input side of supplemental passage 50 is a second spring seat 56 into which an annularly shaped resilient disk 58 is preferably inserted as a liner for seat 56. Formed annularly within the output side of supplemental passage 50 is a valve seat 59. Compressed between first and second spring seats 55 and 56 and concentric to the shaft of valve stem 52, spring 53 normally biases the dynamic flow valve 51 into the closed position. In the closed position, dynamic flow valve 51 has the left side of its valve head 54 seated against valve seat 59 by the force of spring 53.

The differential pressure transducer 22 is pneumatically tapped into input chamber 41 by passageway 26 and into output chamber 49 by passageway 27. Differential pressure transducer 22 is used to sense simultaneously the pressure in each chamber and generate an analog electrical signal whose voltage, current or other electrical quality is proportional to the difference in pressure existing across primary orifice 45 and supplemental passage 50. As with the prior art mechanism 13, this analog electrical signal is carried by the appropriate wiring to the brake control computer where it is converted to digital form and acted upon according to the instructions of the railroad company.

How the dynamic flow adapter 200 operates mechanically depends on the rate at which air is flowing through it. When air flows from the MR through input passage 20 into input chamber 41 at a rate less than or equal to a predetermined threshold amount, the force with which the air stream impacts the front surface of contact plate 55 is insufficient to overcome the bias of spring 53. Valve stem 52 thus remains stationary, leaving the valve head 54 fully seated against valve seat 59. When the rate at which air flows into input chamber 41 increases above the predetermined threshold amount, however, the force with which the air stream impacts the contact plate 55 is sufficient to overcome the bias of spring 53. Viewed from the perspective of FIG. 3, contact plate 55 moves to the right thus further compressing spring 53 between the first and second spring seats. Compelled by contact plate 55, valve stem 52 moves valve head 54 rightward off and away from valve seat 59. Until it reaches its fully open position, valve head 54 will open to the extent determined by the rate at which the air stream is flowing into input chamber 41.

Regarding the dimensions of the orifices in the dynamic flow adapter 200, the primary orifice 45 is preferably selected to be less than $19/64$ths of an inch in diameter, i.e., smaller than the standard orifice used in prior art flow adapter mechanisms. For any given flow rate, the pressure across primary orifice 45 will thus be greater, as compared to the standard orifice, due to its smaller dimensions. This means that dynamic flow adapter 200 will enable the flow rate to be measured more accurately than can its prior art predecessors. More specifically, dynamic flow adapter 200 will permit a more accurate measurement of flow rate when it is more important to do so, namely, when the flow rate is less than or equal to the predetermined threshold amount. This is true whether the invention 200 is installed on a locomotive of a conventional or an RMU equipped freight train.

A more accurate measurement of flow rate is particularly important during periods when the brake pipe is being pressurized at a rate less than or equal to the predetermined threshold amount. On conventional freight trains, the train engineer will be better able to discern the difference between normal operation and abnormal operation. For example, in the case where the brakes are completely released, a more accurate measurement of the rate at which air is flowing into the brake pipe will allow the train engineer to discern more readily between the rate needed merely to compensate for minor leakage and the rate indicative of excessive leakage. On RMU freight trains, the RMU componentry in each remote locomotive that has lost radio contact with the lead locomotive will be more capable of distinguishing between the rate needed merely to compensate for minor leakage and the rate characteristic of a pneumatic command to apply the brakes. Simply stated, a remote locomotive will be better able to detect, and act upon, a brake application during disruption of the radio link.

The size of the secondary orifice 65 should be selected to accommodate operation of the locomotive when air is charging the brake pipe at a rate greater than the predetermined threshold amount. More specifically, the diameter of secondary orifice 65 is preferably selected so that the maximum rate at which air can flow through the adapter 200 when dynamic flow valve 51 therein is fully opened is equivalent to that which the adapter 200 would allow if it had a single orifice measuring $19/64$ths of an inch.

The flow rates through primary orifice 45 for which accurate measurement is most important would preferably be in the range of 99 CFM and below. This means that dynamic flow valve 51 begins to open at a flow rate of 99 CFM. Equipped with a primary orifice of appropriate size, the range of flow rates that differential pressure transducer 22 would be required to measure would thus be smaller than the range of 135 CFM and below typical of prior art flow adapter mechanisms.

Each railroad company may act upon the electrical signal output by the differential pressure transducer 22 according to its own particular needs. For example, the brake control computer can convert this analog signal to digital form and act upon the resulting digital signal as described earlier in the background section. This would include conveying it to the cab control computer, with the cab control computer, in turn, conveying it to the display. The train engineer can then monitor the current rate, if any, at which air is flowing into the brake pipe BP of the locomotive merely by glancing at the flow rate indicator on the display. Optionally, the system could also be programmed so that the flow rate indicator will indicate only the predetermined threshold value (e.g., 99 CFM) whenever the flow rate exceeds the predetermined threshold amount. This is because flow rate values above 99 CFM on a freight train are only encountered only when the brake pipe is being initially charged or when an abnormal condition has occurred somewhere in the charging system.

Equipped with primary and secondary orifices 45 and 65 of the preferred sizes, the dynamic flow adapter 200 is better able to strike the aforementioned balance. On the one hand, for flow rates less than or equal to the predetermined threshold amount, the dynamic flow adapter 200 will enable the flow rate to be measured more accurately than the prior art flow adapter mechanisms. On the other hand, for flow rates greater than the predetermined threshold amount, especially when dynamic flow valve 51 is fully open, the dynamic flow adapter 200 will allow the brake pipe (and the storage reservoirs on the railcars) to be charged within an acceptable period of time. This is important because the brake control valves on all the railcars may not operate properly if the rate at which they are supplied with air is too low. The dynamic flow adapter 200 thus more finely balances (i) the need for a high flow rate to assure the brake control valves work properly against (ii) the benefits of measuring the flow rate more accurately on both conventional and RMU equipped freight trains.

Differential pressure transducer 22 essentially serves as a means for generating an electrical signal proportional to the difference in pressure between input chamber 41 and output chamber 49. Together with the brake control computer, this transducer 22 is used to determine the rate at which air flows through the dynamic flow adapter 200. In lieu of differential pressure transducer 22, dynamic flow adapter 200 may also be implemented using any one of the two transducer arrangements disclosed in U.S. Pat. No. 5,621,657 to Ferri. U.S. Pat. No. 5,621,657 is assigned to the assignee of the invention described and claimed in this document, and its teachings are incorporated herein by reference. Various other arrangements or even different parts that together perform the same function as the cited means are intended to be encompassed by one or more of the following claims.

The presently preferred embodiment for carrying out the invention has been set forth in detail according to the Patent Act. Persons of ordinary skill in the art to which this invention pertains may nevertheless recognize various alternative ways of practicing the invention without departing from the spirit and scope of the following claims. Persons who possess such skill will also recognize that the foregoing description is merely illustrative and not intended to limit any of the ensuing claims to any particular narrow interpretation.

Accordingly, to promote the progress of science and the useful arts, we secure for ourselves by Letters Patent exclusive rights to all subject matter embraced by the following claims for the time prescribed by the Patent Act.

We claim:

1. A dynamic flow adapter for use in measuring the rate at which a fluid flows therethrough, said dynamic flow adapter comprising:

(a) an adapter housing defining an input passage, an input chamber, a primary passage, a supplemental passage, an output chamber, a secondary passage and an output passage; said primary passage containing therein a primary orifice having a diameter less than $19/64$ inch so as to permit accurate measurement of flow rates when such flow rate is one of less than and equal to a predetermined threshold amount; said secondary passage containing therein a secondary orifice having a second diameter; said input passage directly communicating with said input chamber; said input and output chambers communicating through said primary orifice in said primary passage; said output chamber communicating with said output passage through said secondary orifice in said secondary passage; said supplemental passage being in parallel with said primary passage and when opened allowing further communication between said input and output chambers;

(b) a dynamic flow valve disposed within said supplemental passage, said dynamic flow valve for (i) closing said supplemental passage when the rate at which such fluid flows from said input passage to said input chamber is less than or equal to a predetermined threshold amount and (ii) opening said supplemental passage, to an extent determined up to a fully open position by the rate at which such fluid flows into said input chamber, thereby also allowing such fluid to flow through said supplemental passage when the rate at which such fluid flows into said input chamber is greater than said predetermined threshold amount; and (c) a means for generating an electrical signal proportional to a difference between pressure sensed in said input chamber and pressure sensed in said output chamber.

2. The dynamic flow adapter claimed in claim 1 wherein said second diameter of said secondary orifice is selected so that the rate at which such fluid flows through said dynamic flow adapter when said dynamic flow valve therein is fully opened is equivalent to that which said dynamic flow adapter would allow if said dynamic flow adapter had a single orifice measuring $19/64$ths of an inch in diameter.

3. The dynamic flow adapter claimed in claim 1 wherein said electrical signal that said means generates when said dynamic flow valve is closed embodies a more accurate measurement of the rate at which such fluid is flowing through said dynamic flow adapter as compared to said electrical signal that said means generates when said dynamic flow valve is open.

4. The dynamic flow adapter claimed in claim 1 wherein said predetermined threshold amount is approximately 99 CFM.

5. The dynamic flow adapter claimed in claim 1 wherein said means is a differential pressure transducer that is pneumatically tapped into said input chamber by one passageway and into said output chamber by another passageway.

6. The dynamic flow adapter claimed in claim 1 wherein said dynamic flow valve includes:

(a) a valve stem longitudinally disposed within said supplemental passage, said valve stem having a shaft and a contact plate attached to one end of said shaft, said contact plate having (i) a front surface against which such fluid flowing from said input passage into said input chamber impacts and (ii) a rear surface serving as a first spring seat;

(b) a valve head attached to an opposite end of said shaft;

(c) a second spring seat formed annularly within an input side of said supplemental passage;

(d) a valve seat formed annularly within an output side of said supplemental passage; and (e) a spring concentric to said shaft and compressively disposed between said first and second spring seats, said spring for biasing said valve head against said valve seat; such that when the rate at which such fluid flows into said input chamber is (i) less than or equal to said predetermined threshold amount, the force with which such fluid impacts said contact plate is insufficient to overcome said bias of said spring thereby leaving said valve head seated against said valve seat and (ii) greater than said predetermined threshold amount, the force with which such fluid impacts said contact plate is sufficient to overcome said bias of said spring and thereby move said valve head off said valve seat to an extent determined, up to a fully open position, by the rate at which such fluid flows into said input chamber.

7. The dynamic flow adapter claimed in claim 1 wherein said second diameter of said secondary orifice is selected so that the rate at which such fluid flows through said dynamic flow adapter when said dynamic flow valve therein is fully opened is equivalent to that which said dynamic flow adapter would allow if said dynamic flow adapter had a single orifice measuring approximately $19/64$ths of an inch in diameter.

8. The dynamic flow adapter claimed in claim 7 wherein said means is a differential pressure transducer that is pneumatically tapped into said input chamber by one passageway and into said output chamber by another passageway.

9. The dynamic flow adapter claimed in claim 8 wherein said electrical signal that said differential pressure transducer generates when said dynamic flow valve is closed embodies a more accurate measurement of the rate at which such fluid is flowing through said dynamic flow adapter as compared to said electrical signal that said differential pressure transducer generates when said dynamic flow valve is open.

10. The dynamic flow adapter claimed in claim 9 wherein said predetermined threshold amount is approximately 99 CFM.

11. The dynamic flow adapter claimed in claim 10 wherein said dynamic flow valve includes:

(a) a valve stem longitudinally disposed within said supplemental passage, said valve stem having a shaft and a contact plate attached to one end of said shaft, said contact plate having (i) a front surface against which such fluid flowing from said input passage into said input chamber impacts and (ii) a rear surface serving as a first spring seat;

(b) a valve head attached to an opposite end of said shaft;

(c) a second spring seat formed annularly within an input side of said supplemental passage;

(d) a valve seat formed annularly within an output side of said supplemental passage; and (e) a spring concentric to said shaft and compressively disposed between said first and second spring seats, said spring for biasing said valve head against said valve seat; such that when the rate at which such fluid flows into said input chamber is (i) less than or equal to said predetermined threshold amount, the force with which such fluid impacts said contact plate is insufficient to overcome said bias of said spring thereby leaving said valve head seated against said valve seat and (ii) greater than said predetermined threshold amount, the force with which such fluid impacts said contact plate is sufficient to overcome said bias of said spring and thereby move said valve head off said valve seat to an extent determined, up to a fully open position, by the rate at which such fluid flows into said input chamber.

12. A dynamic flow adapter for use in measuring the rate at which a fluid flows therethrough, said dynamic flow adapter comprising:

(a) an adapter housing defining an input passage, an input chamber, a primary passage, a supplemental passage, an output chamber, a secondary passage and an output passage; said primary passage containing therein a primary orifice having a first diameter, said first diameter of said primary orifice is less than $19/64$ths inch; said secondary passage containing therein a secondary orifice having a second diameter; said input passage directly communicating with said input chamber; said input and output chambers communicating through said primary orifice; said output chamber communicating with said output passage through said secondary orifice; said supplemental passage being in parallel with said primary passage and when opened allowing further communication between said input and output chambers;

(b) a dynamic flow valve disposed within said supplemental passage, said dynamic flow valve including:

(i) a valve stem longitudinally disposed within said supplemental passage, said valve stem having a shaft and a contact plate attached to one end of said shaft, said contact plate having a front surface against which such fluid flowing from said input passage into said input chamber impacts and a rear surface serving as a first spring seat;

(ii) a valve head attached to an opposite end of said shaft;

(iii) a second spring seat formed annularly within an input side of said supplemental passage;

(iv) a valve seat formed annularly within an output side of said supplemental passage; and (v) a spring concentric to said shaft and compressively disposed between said first and second spring seats, said spring for biasing said valve head against said valve seat;

such that when the rate at which such fluid flows into said input chamber is (A) less than or equal to a predetermined threshold amount, the force with which such fluid impacts said contact plate is insufficient to overcome said bias of said spring thereby leaving said valve head seated against said valve seat and (B) greater than said predetermined threshold amount, the force with which such fluid impacts said contact plate is sufficient to overcome said bias of said spring and thereby move said valve head off said valve seat to an extent determined, up to a fully open position, by the rate at which such fluid is flowing into said input chamber; and (c) a means for generating an electrical signal proportional to a difference between pressure sensed in said input chamber and pressure sensed in said output chamber.

13. The dynamic flow adapter claimed in claim 12, wherein said second diameter of said secondary orifice is selected so that the rate at which such fluid flows through said dynamic flow adapter when said dynamic flow valve therein is fully opened is equivalent to that which said dynamic flow adapter would allow if said dynamic flow adapter had a single orifice measuring $19/64$ths of an inch in diameter.

14. The dynamic flow adapter claimed in claim 12 wherein said electrical signal that said means generates when said dynamic flow valve is closed embodies a more accurate measurement of the rate at which such fluid is flowing through said dynamic flow adapter as compared to said electrical signal that said means generates when said dynamic flow valve is open.

15. The dynamic flow adapter claimed in claim 12 wherein said predetermined threshold amount is approximately 99 CFM.

16. The dynamic flow adapter claimed in claim 12 wherein said means is a differential pressure transducer that is pneumatically tapped into said input chamber by one passageway and into said output chamber by another passageway.

* * * * *